United States Patent
Koithan et al.

(10) Patent No.: US 7,594,540 B2
(45) Date of Patent: *Sep. 29, 2009

(54) METHODS AND APPARATUS FOR APPLYING TORQUE AND ROTATION TO CONNECTIONS

(75) Inventors: Thomas Koithan, Houston, TX (US); Graham Ruark, Houston, TX (US); John W. Newman, Winnsboro, LA (US); David M. Haugen, League City, TX (US); David Shahin, Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/930,287

(22) Filed: Oct. 31, 2007

(65) Prior Publication Data

US 2008/0047749 A1 Feb. 28, 2008

Related U.S. Application Data

(63) Continuation of application No. 10/723,290, filed on Nov. 25, 2003, now Pat. No. 7,296,623.

(60) Provisional application No. 60/429,681, filed on Nov. 27, 2002.

(51) Int. Cl.
*E21B 19/16* (2006.01)
(52) U.S. Cl. .............. 166/250.01; 166/66; 166/77.51; 166/78.1; 166/380
(58) Field of Classification Search ............ 166/250.01, 166/66, 75.51, 78.1, 360, 77.53; 175/40; 73/152.59, 152.43, 152.49
See application file for complete search history.

(56) References Cited

U.S. PATENT DOCUMENTS

| | | | |
|---|---|---|---|
| 3,368,396 A | 2/1968 | Van Burkleo et al. | |
| 3,606,664 A | 9/1971 | Weiner | |
| 3,606,684 A | 9/1971 | Flatland | |
| 3,662,842 A | 5/1972 | Bromell | |
| 3,745,820 A | 7/1973 | Weiner | |
| 4,008,773 A | 2/1977 | Wallace et al. | |
| 4,091,451 A | 5/1978 | Weiner et al. | |
| 4,106,176 A | 8/1978 | Rice et al. | |
| 4,176,436 A | 12/1979 | McCombs et al. | |

(Continued)

FOREIGN PATENT DOCUMENTS

DE 0087373 2/1983

(Continued)

OTHER PUBLICATIONS

Canadian Office Action, Application No. 2,451,263, dated Dec. 21, 2007.

(Continued)

*Primary Examiner*—Hoang Dang
(74) *Attorney, Agent, or Firm*—Patterson & Sheridan, L.L.P.

(57) ABSTRACT

A method and apparatus for connecting threaded members while ensuring that a proper connection is made. In one embodiment, the applied torque and/or rotation are measured at regular intervals throughout a pipe connection makeup. When a shoulder contact is detected, a predetermined torque value and/or rotation value is added to the measured torque and/or rotation values, respectively, at shoulder contact and rotation continued until this calculated value(s) is reached.

25 Claims, 12 Drawing Sheets

U.S. PATENT DOCUMENTS

| | | | |
|---|---|---|---|
| 4,199,032 | A | 4/1980 | Weiner et al. |
| 4,280,380 | A | 7/1981 | Eshghy |
| 4,365,402 | A | 12/1982 | McCombs et al. |
| 4,592,125 | A | 6/1986 | Skene |
| 4,738,145 | A | 4/1988 | Vincent et al. |
| RE34,063 | E | 9/1992 | Vincent et al. |
| 5,245,265 | A | 9/1993 | Clay |
| 5,245,877 | A | 9/1993 | Ruark |
| 5,402,688 | A | 4/1995 | Okada et al. |
| 5,689,871 | A | 11/1997 | Carstensen |
| 6,374,706 | B1 | 4/2002 | Newman |
| 6,443,241 | B1 | 9/2002 | Juhasz et al. |
| 6,536,520 | B1 | 3/2003 | Snider et al. |
| 7,296,623 | B2 * | 11/2007 | Koithan et al. ......... 166/250.01 |
| 2002/0157823 | A1 | 10/2002 | Pietras et al. |
| 2002/0170720 | A1 | 11/2002 | Haugen |
| 2002/0189804 | A1 | 12/2002 | Liess et al. |
| 2003/0173073 | A1 | 9/2003 | Snider et al. |
| 2003/0178847 | A1 | 9/2003 | Galle, Jr. et al. |
| 2004/0069500 | A1 | 4/2004 | Haugen |

FOREIGN PATENT DOCUMENTS

| | | |
|---|---|---|
| DE | 3523221 | 1/1987 |
| EP | 0087373 | 8/1983 |
| GB | 2099620 A | 12/1982 |
| GB | 2 115 940 | 9/1983 |
| WO | WO 03/069113 | 8/2003 |

OTHER PUBLICATIONS

Australian Office Action, Application No. 2003264601 dated Oct. 28, 2008.

* cited by examiner

METHODS AND APPARATUS FOR APPLYING TORQUE AND ROTATION TO CONNECTIONS

CROSS-REFERENCE TO RELATED APPLICATIONS

This application is a continuation of U.S. patent application Ser. No. 10/723,290, filed Nov. 25, 2003, now U.S. Pat. No. 7,296,623, which claims benefit of U.S. Prov. Pat. App. No. 60/429,681, filed Nov. 27, 2002, which is herein incorporated by reference in its entirety.

BACKGROUND OF THE INVENTION

1. Field of the Invention

Embodiments of the present invention generally relate to methods and apparatus for connecting threaded members while ensuring that a proper connection is made.

2. Description of the Related Art

When joining lengths of tubing (i.e., production tubing, casing, drill pipe, etc.; collectively referred to herein as tubing) for oil wells, the nature of the connection between the lengths of tubing is critical. It is conventional to form such lengths of tubing to standards prescribed by the American Petroleum Institute (API). Each length of tubing has an internal threading at one end and an external threading at another end. The externally-threaded end of one length of tubing is adapted to engage in the internally-threaded end of another length of tubing. API type connections between lengths of such tubing rely on thread interference and the interposition of a thread compound to provide a seal.

For some oil well tubing, such API type connections are not sufficiently secure or leakproof. In particular, as the petroleum industry has drilled deeper into the earth during exploration and production, increasing pressures have been encountered. In such environments, where API type connections are not suitable, it is conventional to utilize so-called "premium grade" tubing which is manufactured to at least API standards but in which a metal-to-metal sealing area is provided between the lengths. In this case, the lengths of tubing each have tapered surfaces which engage one another to form the metal-to-metal sealing area. Engagement of the tapered surfaces is referred to as the "shoulder" position/condition.

Whether the threaded pipe members are of the API type or are premium grade connections, methods are needed to ensure a good connection. One method involves the connection of two co-operating threaded pipe sections, rotating the pipe sections relative to one another by means of a power tong, measuring the torque applied to rotate one section relative to the other and the number of rotations or turns which one section makes relative to the other. Signals indicative of the torque and turns are fed to a controller which ascertains whether the measured torque and turns fall within a predetermined range of torque and turns which are known to produce a good connection. Upon reaching a torque-turn value within a prescribed minimum and maximum (referred to as a dump value), the torque applied by the power tong is terminated. An output signal, e.g. an audible signal, is then operated to indicate whether the connection is a good or a bad connection.

As indicated above, a leakproof metal-to-metal seal is to be achieved, and in order for the seal to be effective, the amount of torque applied to effect the shoulder condition and the metal-to-metal seal is critical. In the case of premium grade connections, the manufacturers of the premium grade tubing publish torque values required for correct makeup utilizing a particular tubing. Such published values may be based on minimum, optimum and maximum torque values, or an optimum torque value only. Current practice is to makeup the connection to within a predetermined torque range while plotting the applied torque vs. rotation or time, and then make a visual inspection and determination of the quality of the makeup. However, in addition to being highly subjective, such an approach fails to take into consideration other factors which can result in final torque values indicating a good final make-up condition when, in fact, a leakproof seal may not necessarily have been achieved. Such other factors include, for example, the coefficient of friction of the lubricant, cleanliness of the connection surfaces, surface finish of the connection parts, manufacturing tolerances, etc. In general, the most significant factor is the coefficient of friction of the lubricant which will vary with ambient temperature and change during connection make-up as the various components of the lubricant break down under increasing bearing pressure. Eventually, the coefficient of friction tends to that of steel, whereupon the connection will be damaged with continued rotation.

Therefore, there is a need for methods and apparatus for connecting threaded members while ensuring that a proper connection is made, particularly for premium grade connections.

SUMMARY OF THE INVENTION

The present invention generally provides methods and apparatus for connecting threaded members while ensuring that a proper connection is made, particularly for premium grade connections.

In a first embodiment, a method of connecting threaded members is provided. The method comprises the steps of: rotating two threaded members relative to one another; detecting an event during relative rotation between the two threaded members; and stopping relative rotation between the threaded members when reaching a predefined value from the detected event. Preferably, the two threaded members define a shoulder seal, the event is a shoulder condition, and the predefined value is a rotation value. Further, an apparatus is provided for carrying out this method.

In a second embodiment, the applied torque and rotation are measured at regular intervals throughout a pipe connection makeup. The rate of change of torque with rotation (derivative) is calculated for each set of measurements. These three values (torque, rotation and rate of change of torque) are then compared either continuously or at selected rotational positions, with minimum and maximum acceptable predetermined values, and a decision made whether to continue rotation or abort the makeup. Additionally, the derivative (rate of change of torque) is compared with predetermined threshold values to determine seal and shoulder contact points. The change in torque and rotation between these two detected contact points is checked to ensure that the change is within a predetermined acceptable range. When the shoulder contact is detected, a predetermined torque value and/or rotation value is added to the measured torque and/or rotation values, respectively, at shoulder contact and rotation continued until this calculated value(s) is reached. The application of torque is terminated and the reverse rotation of a tubing length is monitored as the connection relaxes. If the relaxation is within an acceptable predetermined range and the above conditions are met then the makeup is considered acceptable.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention generally provides methods and apparatus for characterizing pipe connections. In particular, an aspect of the present invention provides for characterizing the make-up of premium grade tubing.

As used herein, premium grade tubing refers to tubing wherein one length can be connected to another by means of a connection incorporating a shoulder which assists in sealing of the connection by way of a metal-to-metal contact.

Premium Grade Tubing

Figure 1:
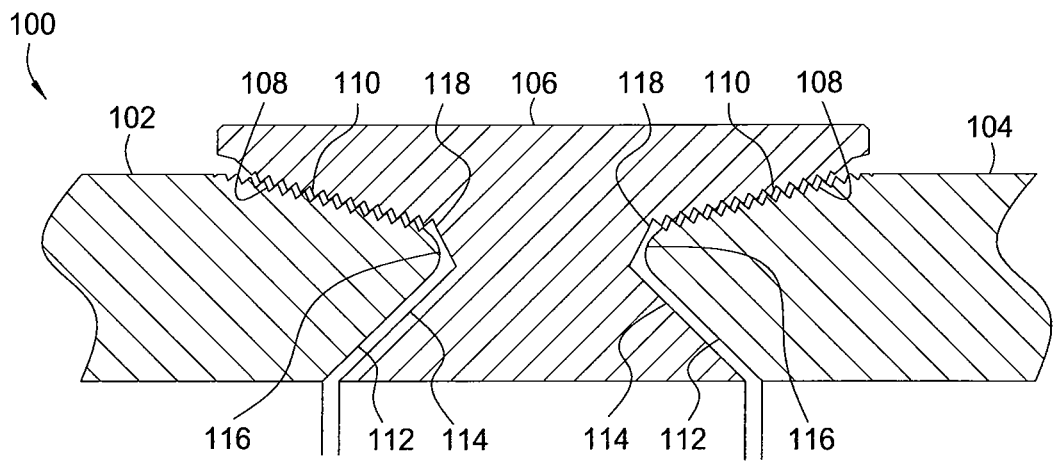
FIG. 1 is a partial cross section view of a connection between threaded premium grade members.

FIG. 1 illustrates one form of a premium grade tubing connection to which aspects of the present invention are applicable. In particular, FIG. 1 shows a tapered premium grade tubing assembly 100 having a first tubing length 102 joined to a second tubing length 104 through a tubing coupling or box 106. The end of each tubing length 102 and 104 has a tapered externally-threaded surface 108 which co-operates with a correspondingly tapered internally-threaded surface 110 on the coupling 106. Each tubing length 102 and 104 is provided with a tapered torque shoulder 112 which co-operates with a correspondingly tapered torque shoulder 114 on the coupling 106. At a terminal end of each tubing length 102, 104, there is defined an annular sealing area 116 which is engageable with a co-operating annular sealing area 118 defined between the tapered portions 110 and 114 of the coupling 106.

Figure 2:
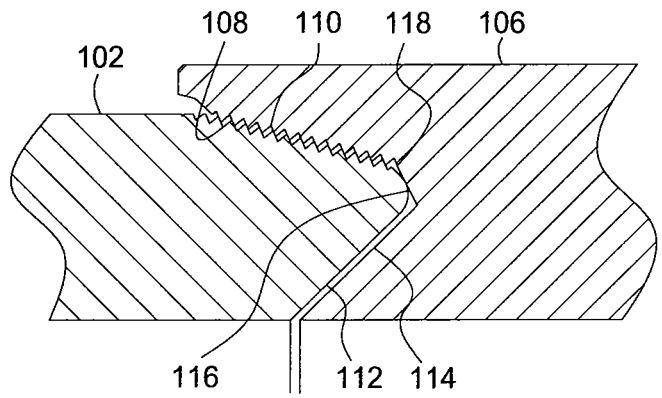
FIG. 2 is a partial cross section view of a connection between threaded premium grade members in which a seal condition is formed by engagement between sealing surfaces.
Figure 3:
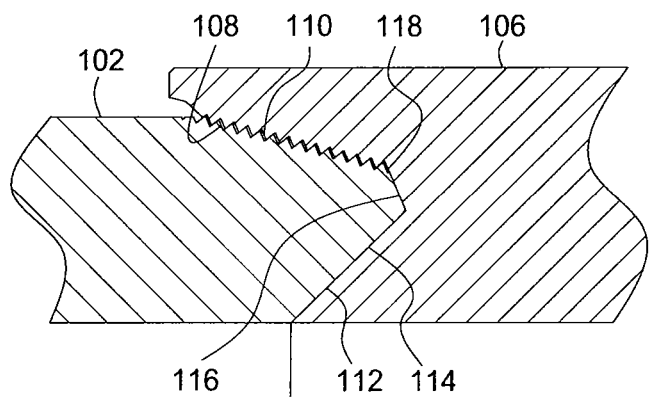
FIG. 3 is a partial cross section view of a connection between threaded premium grade members in which a shoulder condition is formed by engagement between shoulder surfaces.

During make-up, the tubing lengths 102, 104 (also known as pins), are engaged with the box 106 and then threaded into the box by relative rotation therewith. During continued rotation, the annular sealing areas 116, 118 contact one another, as shown in FIG. 2. This initial contact is referred to herein as the "seal condition". As the tubing lengths 102, 104 are further rotated, the co-operating tapered torque shoulders 112 and 114 contact and bear against one another at a machine detectable stage referred to as a "shoulder condition" or "shoulder torque", as shown in FIG. 3. The increasing pressure interface between the tapered torque shoulders 112 and 114 cause the seals 116,118 to be forced into a tighter metal-to-metal sealing engagement with each other causing deformation of the seals 116 and eventually forming a fluid-tight seal.

It will be appreciated that although aspects of the invention have been described with respect to a tapered premium grade connection, the invention is not so limited. Accordingly, in some embodiments aspects of the invention are implemented using parallel premium grade connections. Further, some connections do not utilize a box or coupling (such as box 106). Rather, two tubing lengths (one having external threads at one end, and the other having cooperating internals threads) are threadedly engaged directly with one another. The invention is equally applicable to such connections. In general, any pipe forming a metal-to-metal seal which can be detected during make up can be utilized. Further, use of the term "shoulder" or "shoulder condition" is not limited to a well-defined shoulder as illustrated in FIGS. 1-3. It may include a connection having a plurality of metal-to-metal contact surfaces which cooperate together to serve as a "shoulder." It may also include a connection in which an insert is placed between two non-shouldered threaded ends to reinforce the connection, such as may be done in drilling with casing. In this regard, the invention has application to any variety of tubulars characterized by function including: drill pipe, tubing/casing, risers, and tension members. The connections used on each of these tubulars must be made up to a minimum preload on a torque shoulder if they are to function within their design parameters and, as such, may be used to advantage with the present invention.

Characterizing Tubing Behavior

Figure 4:
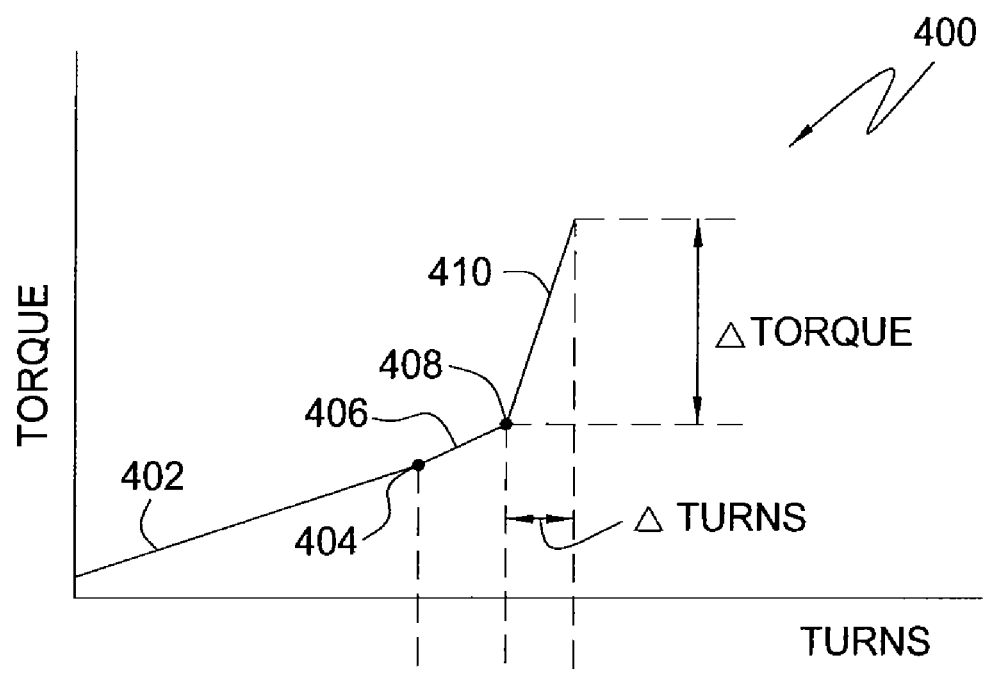
FIG. 4 is an x-y plot of torque with respect to turns.
Figure 5:
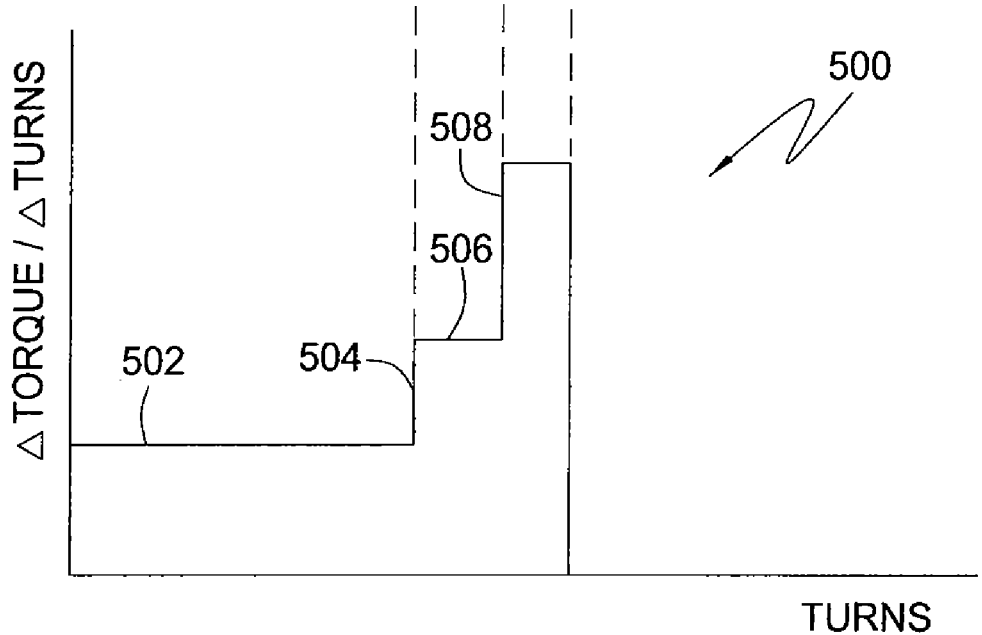
FIG. 5 is an x-y plot of the rate of change in torque with respect to turns.

During make-up of tubing lengths torque may be plotted with respect to time or turns. According to an embodiment of the present invention, torque is preferably measured with respect to turns. FIG. 4 shows a typical x-y plot (curve 400) illustrating the (idealized) acceptable behavior of premium grade tubulars, such as the tapered premium grade tubing assembly 100 shown in FIG. 1-3. FIG. 5 shows a corresponding chart plotting the rate of change in torque (y-axis) with respect to turns (x-axis). Accordingly, FIGS. 4-5 will be described with reference to FIGS. 1-3. Shortly after the tubing lengths engage one another and torque is applied (corresponding to FIG. 1), the measured torque increases substantially linearly as illustrated by curve portion 402. As a result, corresponding curve portion 502 of the differential curve 500 of FIG. 5 is flat at some positive value. During continued rotation, the annular sealing areas 116, 118 contact one another causing a slight change (specifically, an increase) in the torque rate, as illustrated by point 404. Thus, point 404 corresponds to the seal condition shown in FIG. 2 and is plotted as the first step 504 of the differential curve 500. The torque rate then again stabilizes resulting in the linear curve portion 406 and the plateau 506. In practice, the seal condition (point 404) may be too slight to be detectable. However, in a properly behaved make-up, a discernable/detectable change in the torque rate occurs when the shoulder condition is achieved (corresponding to FIG. 3), as represented by point 408 and step 508.

By way of illustration only, the following provides an embodiment for calculating the rate of change in torque with respect to turns:

Rate of Change (ROC) Calculation

Let $T_1, T_2, T_3, \ldots T_x$ represent an incoming stream of torque values.

Let $C_1, C_2, C_3, \ldots C_x$ represent an incoming stream of turns values that are paired with the Torque values.

Let y represent the turns increment number >1.

The Torque Rate of Change to Turns estimate (ROC) is defined by:

$$ROC := (T_y - T_{y-1})/(C_y - C_{y-1}) \text{ in Torque units per Turns units.}$$

Once the shoulder condition is detected, some predetermined number of turns or torque value can be added to achieve the terminal connection position (i.e., the final state of a tubular assembly after make-up rotation is terminated). Alternatively, the terminal connection position can be achieved by adding a combination of number of turns and a torque value. In any case, the predetermined value(s) (turns and/or torque) is added to the measured torque or turns at the time the shoulder condition is detected. Various embodiments will be described in more detail below.

Apparatus

Figure 6:
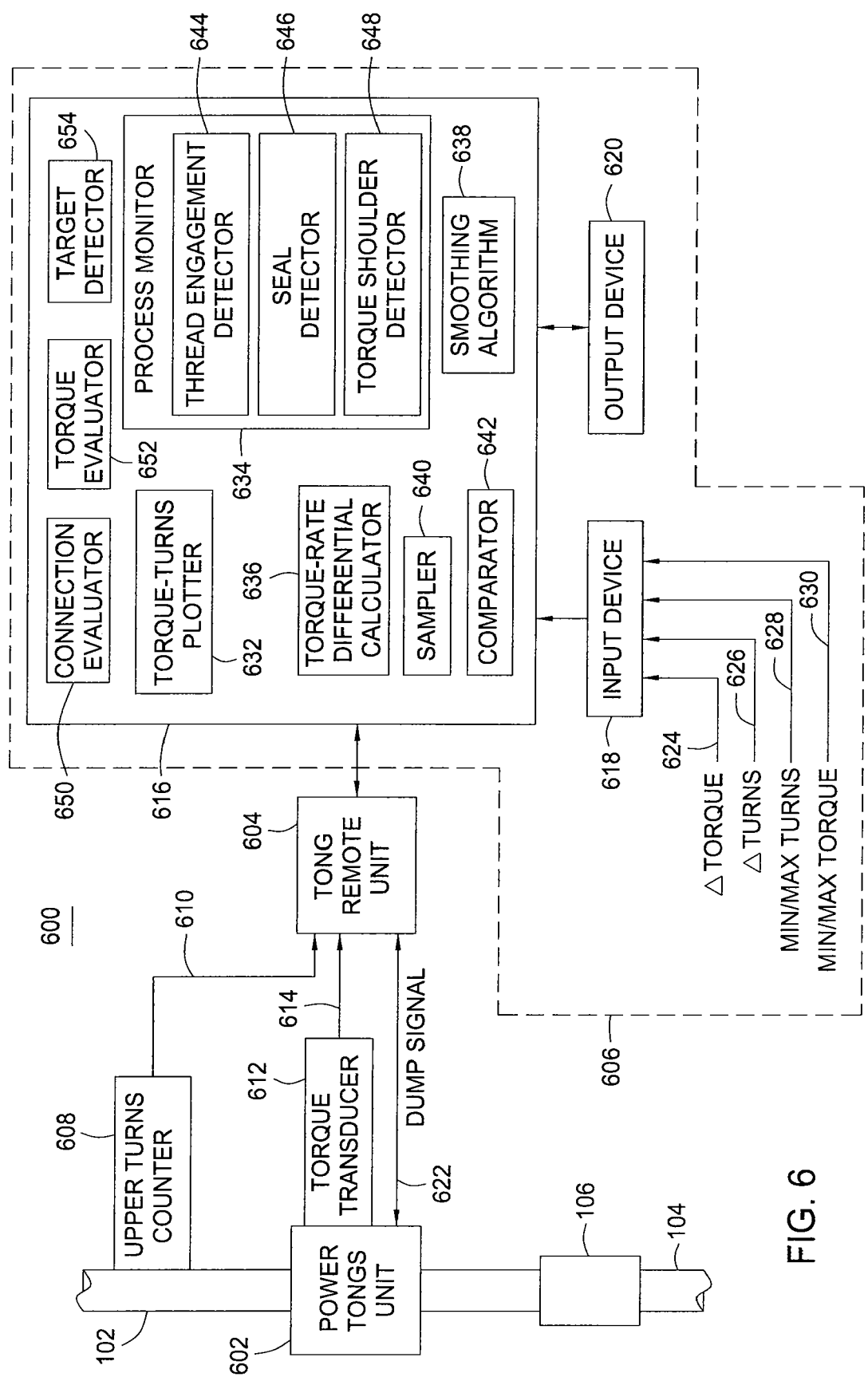
FIG. 6 is block diagram illustrating one embodiment of a power tongs system.
Figure 6A:
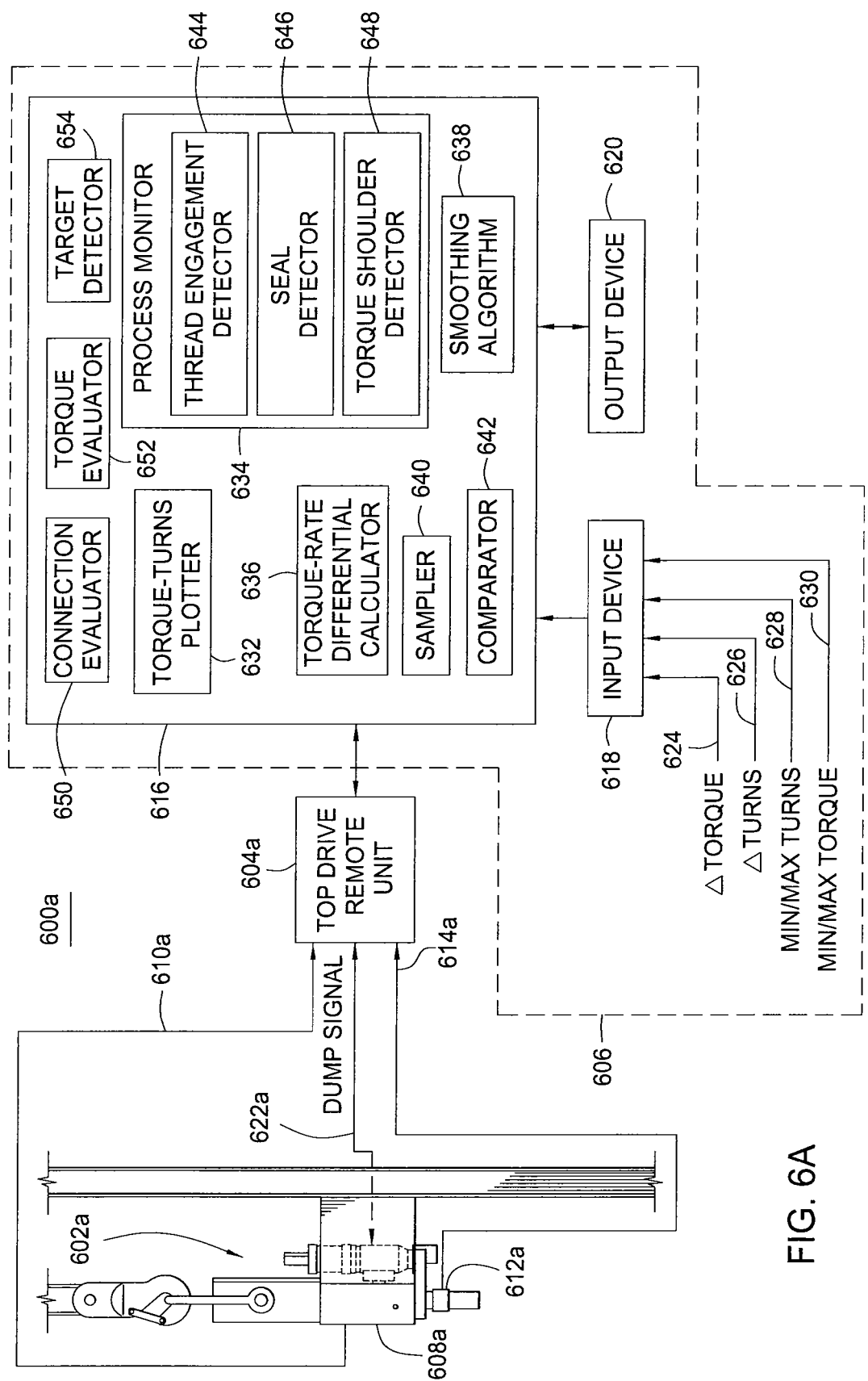
FIG. 6A is block diagram illustrating one embodiment of a top drive system.

The above-described torque-turns behavior can be generated using various measuring equipment in combination with a power drive unit used to couple tubing lengths. Examples of a power drive unit include a power tongs unit, typically hydraulically powered, and a top drive unit. According to aspects of the present invention, a power drive unit is operated in response to one or more parameters measured/detected during make-up of a pipe connection. FIGS. 6 and 6A are block diagrams of tubular make-up systems 600 and 600a according to embodiments of the invention. Generally, the tubular make-up systems 600 and 600a comprise power drive units 602 and 602a, power drive control systems 604 and 604a, and a computer system 606. In FIG. 6, the power drive unit is a power tongs unit 602. In FIG. 6A, the power drive unit is a top drive unit 602a. The physical locations of the tie-ins between the top drive control system 604a and the top drive 602a are representative only and may be varied based on specific top drive configurations. The power drive unit may be any variety of apparatus capable of gripping and rotating a tubing length 102, the lower end of which is threaded into a box 106 which, in turn, is threaded into the upper end of a tubing length 104. The tubing length 104 represents the upper end of a pipe string extending into the bore hole of a well (not shown). Since the power tongs unit 602 may be an apparatus well-known in the industry, it is not shown in detail. The tubing lengths 102 and 104 and box 106 are not shown in FIG. 6A but are shown in the figures illustrating more detail of the top drive 602a, discussed below.

Turns counters 608 and 608a sense the rotation of the upper tubing length 102 and generates turns count signals 610 and 610a representing such rotational movement. In one embodiment, the box 106 may be secured against rotation so that the turns count signals 610 and 610a accurately reflect the relative rotation between the upper tubing length 102 and the box 106. Alternatively or additionally, a second turns counter may be provided to sense the rotation of the box 106. The turns count signal issued by the second turns counter may then be used to correct (for any rotation of the box 106) the turns count signals 610 and 610a issued by turns counters 608 and 608a. In addition, torque transducers 612 and 612a attached to the power tongs unit 602 and top drive unit 602a, respectively, generate torque signals 614 and 614a representing the torque applied to the upper tubing length 102 by the power tongs unit 602 and the top drive unit 602a.

Preferably, the turns and torque values are measured/sampled simultaneously at regular intervals. In a particular embodiment, the turns and torque values are measured a frequency of between about 50 Hz and about 20,000 Hz. Further, the sampling frequency may be varied during makeup. Accordingly, the turns count signals 610 and 610a may represent some fractional portion of a complete revolution. Alternatively, though not typically or desirably, the turns count signals 610 and 610a may be issued only upon a complete rotation of the tubing length 102, or some multiple of a complete rotation.

The signals 610 and 610a, 614 and 614a are inputs to the power drive control systems 604 and 604a. A computer 616 of the computer system 606 monitors the turns count signals and torque signals and compares the measured values of these signals with predetermined values. In one embodiment, the predetermined values are input by an operator for a particular tubing connection. The predetermined values may be input to the computer 616 via an input device, such as a keypad, which can be included as one of a plurality of input devices 618.

Illustrative predetermined values which may be input, by an operator or otherwise, include a delta torque value 624, a delta turn value 626, minimum and maximum turns values 628, and minimum and maximum torque values 630. As used herein, the delta torque value 626 and the delta turn value 628 are values applied to the measured torque and turns, respectively, corresponding to a detected shoulder condition (point 408 in FIG. 4). Accordingly, the final torque and turns values at a terminal connection position are dependent upon the state of a tubing assembly when the shoulder condition is reached, and therefore these final values may be considered wholly unknown prior to reaching the shoulder condition.

During makeup of a tubing assembly, various output may be observed by an operator on output device, such as a display screen, which may be one of a plurality of output devices 620. The format and content of the displayed output may vary in different embodiments. By way of example, an operator may observe the various predefined values which have been input for a particular tubing connection. Further, the operator may observe graphical information such as a representation of the torque rate curve 400 and the torque rate differential curve 500. The plurality of output devices 620 may also include a printer such as a strip chart recorder or a digital printer, or a plotter, such as an x-y plotter, to provide a hard copy output. The plurality of output devices 620 may further include a horn or other audio equipment to alert the operator of significant events occurring during make-up, such as the shoulder condition, the terminal connection position and/or a bad connection.

Upon the occurrence of a predefined event(s), the computer system 606 may cause the power drive control systems 604 and 604a to generate dump signals 622 and 622a to automatically shut down the power tongs unit 602 and the top drive unit 602a. For example, dump signals 622 and 622a may be issued upon detecting the terminal connection position and/or a bad connection.

The comparison of measured turn count values and torque values with respect to predetermined values is performed by one or more functional units of the computer 616. The functional units may generally be implemented as hardware, software or a combination thereof. By way of illustration of a particular embodiment, the functional units are described as software. In one embodiment, the functional units include a torque-turns plotter algorithm 632, a process monitor 634, a torque rate differential calculator 636, a smoothing algorithm 638, a sampler 640, and a comparator 642. The process monitor 634 includes a thread engagement detection algorithm 644, a seal detection algorithm 646 and a torque shoulder detection algorithm 648. The function of each of the functional units during make-up of a connection will be described below with reference to FIG. 7. It should be understood, however, that although described separately, the functions of one or more functional units may in fact be performed by a single unit, and that separate units are shown and described herein for purposes of clarity and illustration. As such, the functional units 632-642 may be considered logical representations, rather than well-defined and individually distinguishable components of software or hardware.

Figure 7A:
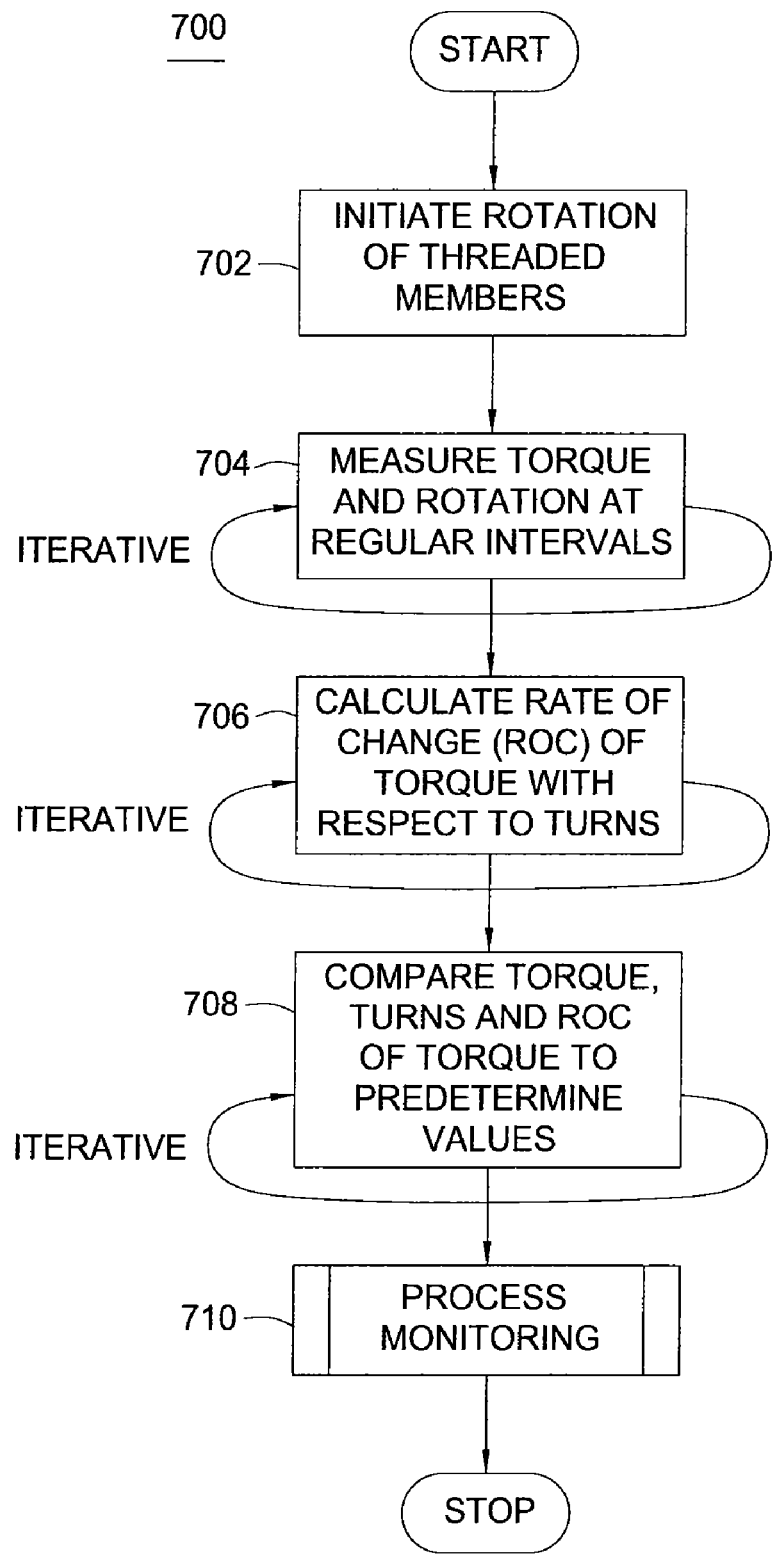
FIGS. 7A-B are a flow diagram illustrating one embodiment for characterizing a connection.
Figure 7B:
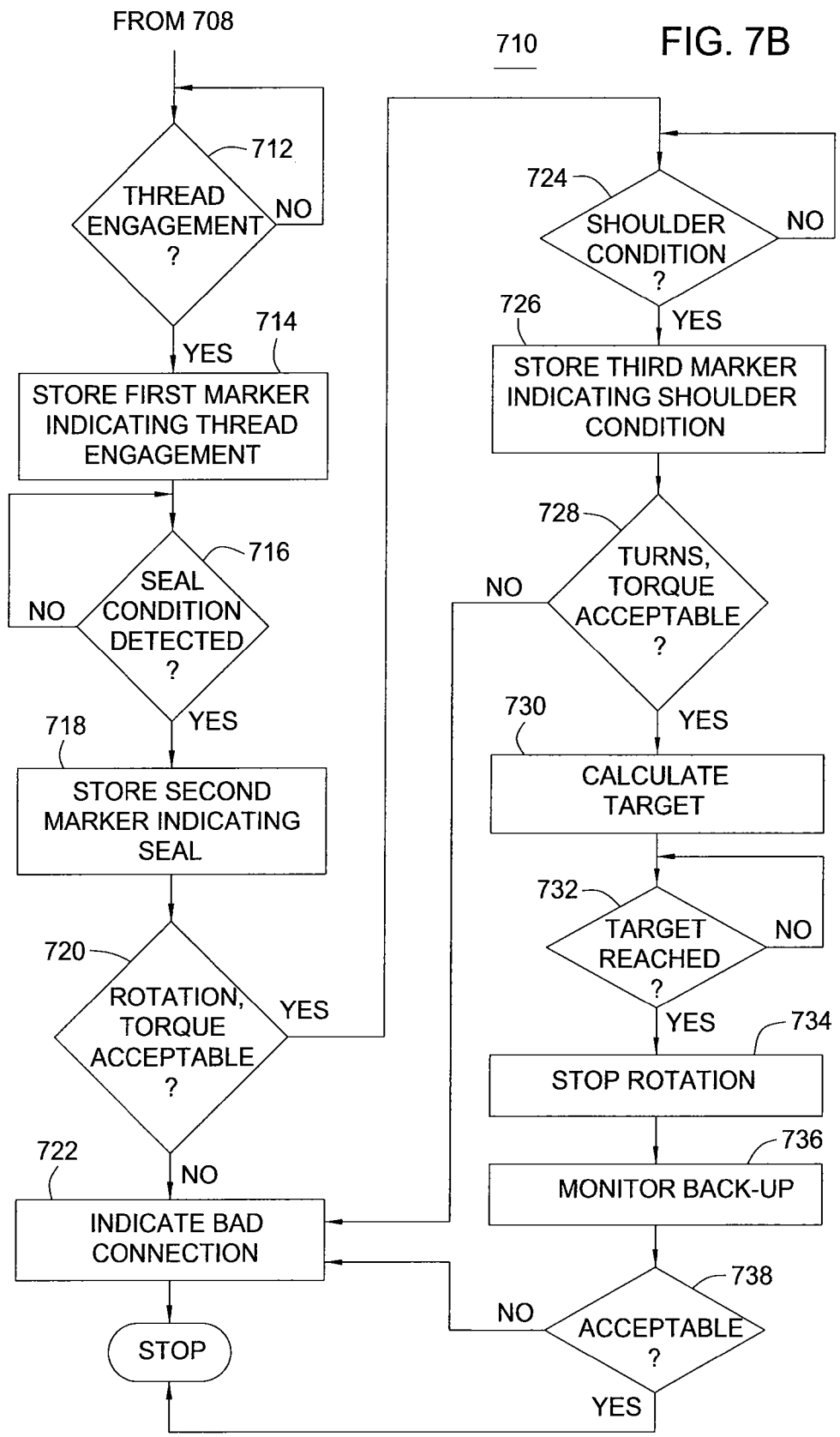

FIG. 7 is one embodiment of a method 700 for characterizing a pipe connection make-up. The method 700 may be implemented by systems 600 and 600a, largely under the control the functional units of the computer 616. The method 700 is initiated when two threaded members are brought together with relative rotation induced by the power tong unit 602 or top drive unit 602a (step 702). Illustratively, the threaded members are the tubing length 102 and the box 106 (FIG. 1). In one embodiment, the applied torque and rotation are measured at regular intervals throughout a pipe connection makeup (step 704). The frequency with which torque and rotation are measured is specified by the sampler 640. The sampler 640 may be configurable, so that an operator may input a desired sampling frequency. The measured torque and rotation values may be stored as a paired set in a buffer area of computer memory (not shown in FIG. 6). Further, the rate of change of torque with rotation (i.e., a derivative) is calculated for each paired set of measurements by the torque rate differential calculator 636 (step 706). Of course, at least two measurements are needed before a rate of change calculation can be made. In one embodiment, the smoothing algorithm 638 operates to smooth the derivative curve (e.g., by way of a running average). These three values (torque, rotation and rate of change of torque) may then be plotted by the plotter 632 for display on the output device 620.

These three values (torque, rotation and rate of change of torque) are then compared by the comparator 642, either continuously or at selected rotational positions, with predetermined values (step 708). For example, the predetermined values may be minimum and maximum torque values and minimum and maximum turn values.

Based on the comparison of measured/calculated values with predefined values, the process monitor 634 determines the occurrence of various events and whether to continue rotation or abort the makeup (710). In one embodiment, the thread engagement detection algorithm 644 monitors for thread engagement of the two threaded members (step 712). Upon detection of thread engagement a first marker is stored (step 714). The marker may be quantified, for example, by time, rotation, torque, a derivative of torque or time, or a combination of any such quantifications. During continued rotation, the seal detection algorithm 646 monitors for the seal condition (step 716). This may be accomplished by comparing the calculated derivative (rate of change of torque) with a predetermined threshold seal condition value. A second marker indicating the seal condition is stored when the seal condition is detected (step 718). At this point, the turns value and torque value at the seal condition may be evaluated by the connection evaluator 650 (step 720). For example, a determination may be made as to whether the turns value and/or torque value are within specified limits. The specified limits may be predetermined, or based off of a value measured during makeup. If the connection evaluator 650 determines a bad connection (step 722), rotation may be terminated. Otherwise rotation continues and the torque shoulder detection algorithm 648 monitors for shoulder condition (step 724). This may be accomplished by comparing the calculated derivative (rate of change of torque) with a predetermined threshold shoulder condition value. When the shoulder condition is detected, a third marker indicating the shoulder condition is stored (step 726). The connection evaluator 650 may then determine whether the turns value and torque value at the shoulder condition are acceptable (step 728). In one embodiment the connection evaluator 650 determines whether the change in torque and rotation between these second and third markers are within a predetermined acceptable range. If the values, or the change in values, are not acceptable, the connection evaluator 650 indicates a bad connection (step 722). If, however, the values/change are/is acceptable, the target calculator 652 calculates a target torque value and/or target turns value (step 730). The target value is calculated by adding a predetermined delta value (torque or turns) to a measured reference value(s). The measured reference value may be the measured torque value or turns value corresponding to the detected shoulder condition. In one embodiment, a target torque value and a target turns value are calculated based off of the measured torque value and turns value, respectively, corresponding to the detected shoulder condition.

Upon continuing rotation, the target detector 654 monitors for the calculated target value(s) (step 732). Once the target value is reached, rotation is terminated (step 734). In the event both a target torque value and a target turns value are used for a given makeup, rotation may continue upon reaching the first target or until reaching the second target, so long as both values (torque and turns) stay within an acceptable range.

In one embodiment, system inertia is taken into account and compensated for to prevent overshooting the target value. System inertia includes mechanical and/or electrical inertia and refers to the system's lag in coming to a complete stop after the dump signal is issued (at step 734). As a result of such lag, the power drive unit continues rotating the tubing member even after the dump signal is issued. As such, if the dump signal is issued contemporaneously with the detection of the target value, the tubing may be rotated beyond the target value, resulting in an unacceptable connection. To ensure that rotation is terminated at the target value (after dissipation of any inherent system lag) a preemptive or predicative dump approach is employed. That is, the dump signal is issued prior to reaching the target value. The dump signal may be issued by calculating a lag contribution to rotation which occurs after the dump signal is issued. In one embodiment, the lag contribution may be calculated based on time, rotation, a combination of time and rotation, or other values. The lag contribution may be calculated dynamically based on current operating conditions such as RPMs, torque, coefficient of thread lubricant, etc. In addition, historical information may be taken into account. That is, the performance of a previous makeup(s) for a similar connection may be relied on to determine how the system will behave after issuing the dump signal. Persons skilled in the art will recognize other methods and techniques for predicting when the dump signal should be issued.

In one embodiment, the sampler 640 continues to sample at least rotation to measure counter rotation which may occur as a connection relaxes (step 736). When the connection is fully relaxed, the connection evaluator 650 determines whether the relaxation rotation is within acceptable predetermined limits (step 738). If so, makeup is terminated. Otherwise, a bad connection is indicated (step 722).

In the previous embodiments turns and torque are monitored during makeup. However, it is contemplated that a connection during makeup may be characterized by either or both of theses values. In particular, one embodiment provides for detecting a shoulder condition, noting a measured turns value associated with the shoulder condition, and then adding a predefined turns value to the measured turns value to arrive at a target turns value. Alternatively or additionally, a measured torque value may be noted upon detecting a shoulder condition and then added to a predefined torque value to arrive at a target torque value. Accordingly, it should be emphasized that either or both a target torque value and target turns value may be calculated and used as the termination value at which makeup is terminated.

However, in one aspect, basing the target value on a delta turns value provides advantages over basing the target value on a delta torque value. This is so because the measured torque value is a more indirect measurement requiring more inferences (e.g., regarding the length of the lever arm, angle between the lever arm and moment of force, etc.) relative to the measured turns value. As a result, prior art applications relying on torque values to characterize a connection between threaded members are significantly inferior to one embodiment of the present intention, which characterizes the connection according to rotation. For example, some prior art teaches applying a specified amount of torque after reaching a shoulder position, but only if the specified amount of torque is less than some predefined maximum, which is necessary for safety reasons. According to one embodiment of the present intention, a delta turns value can be used to calculate a target turns value without regard for a maximum torque value. Such an approach is made possible by the greater degree of confidence achieved by relying on rotation rather than torque.

Whether a target value is based on torque, turns or a combination, the target values are not predefined, i.e., known in advance of determining that the shoulder condition has been reached. In contrast, the delta torque and delta turns values, which are added to the corresponding torque/turn value as measured when the shoulder condition is reached, are predetermined. In one embodiment, these predetermined values are empirically derived based on the geometry and characteristics of material (e.g., strength) of two threaded members being threaded together.

In addition to geometry of the threaded members, various other variables and factors may be considered in deriving the predetermined values of torque and/or turns. For example, the lubricant and environmental conditions may influence the predetermined values. In one aspect, the present invention compensates for variables influenced by the manufacturing process of tubing and lubricant. Oilfield tubes are made in batches, heat treated to obtain the desired strength properties and then threaded. While any particular batch will have very similar properties, there is significant variation from batch to batch made to the same specification. The properties of thread lubricant similarly vary between batches. In one embodiment, this variation is compensated for by starting the makeup of a string using a starter set of determined parameters (either theoretical or derived from statistical analysis of previous batches) that is dynamically adapted using the information derived from each previous makeup in the string. Such an approach also fits well with the use of oilfield tubulars where the first connections made in a string usually have a less demanding environment than those made up at the end of the string, after the parameters have been 'tuned'.

According to embodiments of the present invention, there is provided a method and apparatus of characterizing a connection. Such characterization occurs at various stages during makeup to determine whether makeup should continue or be aborted. In one aspect, an advantage is achieved by utilizing the predefined delta values, which allow a consistent tightness to be achieved with confidence. This is so because, while the behavior of the torque-turns curve 400 (FIG. 4) prior to reaching the shoulder condition varies greatly between makeups, the behavior after reaching the shoulder condition exhibits little variation. As such, the shoulder condition provides a good reference point on which each torque-turns curve may be normalized. In particular, a slope of a reference curve portion may be derived and assigned a degree of tolerance/variance. During makeup of a particular connection, the behavior of the torque-turns curve for the particular connection may be evaluated with respect to the reference curve. Specifically, the behavior of that portion of the curve following detection of the shoulder condition can be evaluated to determine whether the slope of the curve portion is within the allowed tolerance/variance. If not, the connection is rejected and makeup is terminated.

In addition, connection characterizations can be made following makeup. For example, in one embodiment the rotation differential between the second and third markers (seal condition and shoulder condition) is used to determine the bearing pressure on the connection seal, and therefore its leak resistance. Such determinations are facilitated by having measured or calculated variables following a connection makeup. Specifically, following a connection makeup actual torque and turns data is available. In addition, the actual geometry of the tubing and coefficient of friction of the lubricant are substantially known. As such, leak resistance, for example, can be readily determined according to methods known to those skilled in the art.

Persons skilled in the art will recognize other aspects of the invention which provide advantages in characterizing a connection.

As noted above, the present invention has application to any variety of threaded members having a shoulder seal including: drill pipe, tubing/casing, risers, and tension members. In some cases, the type of threaded members being used presents unique problems not present when dealing with other types of threaded members. For example, a common problem when working with drill pipe is cyclic loading. Cyclic loading refers to the phenomenon of a changing stress at the interface between threaded members which occurs in response to, and as a function of, the frequency of pipe rotation during drilling. As a result of cyclic loading, an improperly made up drill string connection (e.g., the connection is to loose) could break during drilling. The likelihood of such problems is mitigated according to aspects of the present invention.

Detail of Top Drive That Grips Inside Casing

U.S. patent application Ser. No. 10/625,840, filed Jul. 23, 2003, is herein incorporated by reference in its entirety.

Figure 8:
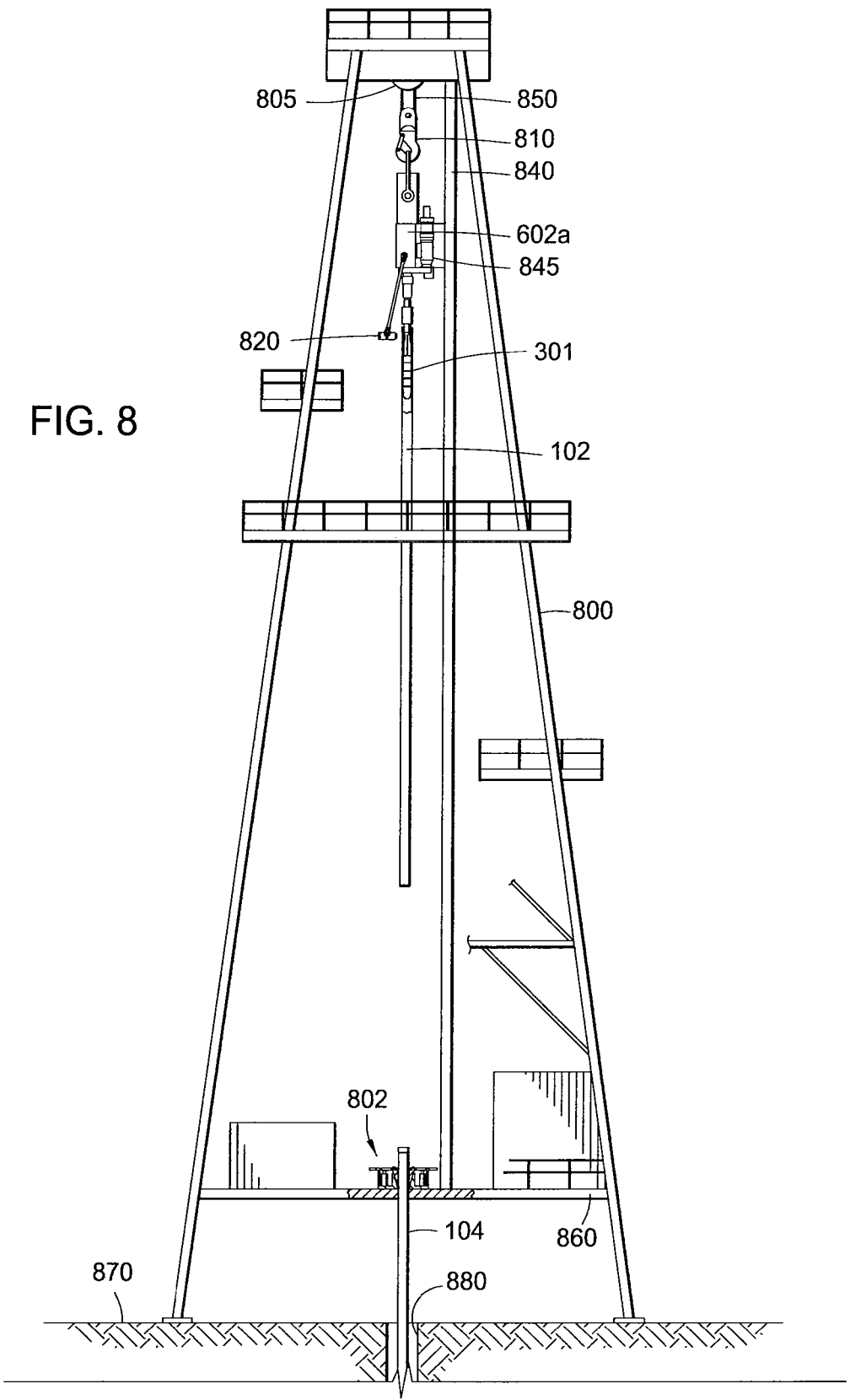
FIG. 8 shows a rig having a top drive and an elevator configured to connect tubulars.

FIG. 8 shows a drilling rig 800 configured to connect and run casings into a newly formed wellbore 880 to line the walls thereof. As shown, the rig 800 includes a top drive 602a, an elevator 820, and a spider 802. The rig 800 is built at the surface 870 of the well. The rig 800 includes a traveling block 810 that is suspended by wires 850 from draw works 805 and holds the top drive 602a. The top drive 602a has a gripping member 301 for engaging the inner wall of the casing 102 and a motor 895 to rotate the casing 102. The motor 895 may rotate and thread the casing 102 into the casing string 104 held by the spider 802. The gripping member 301 facilitate the engagement and disengagement of the casing 102 without having to thread and unthread the casing 102 to the top drive 602a. Additionally, the top drive 602a is coupled to a railing system 840. The railing system 840 prevents the top drive 602a from rotational movement during rotation of the casing string 104, but allows for vertical movement of the top drive 602a under the traveling block 810.

In FIG. 8, the top drive 602a is shown engaged to casing 102. The casing 102 is placed in position below the top drive 602a by the elevator 820 in order for the top drive 602a to engage the casing 102. Additionally, the spider 802, disposed on the platform 860, is shown engaged around a casing string 104 that extends into wellbore 880. Once the casing 102 is positioned above the casing string 104, the top drive 602a can lower and thread the casing 102 into the casing string 104, thereby extending the length of the casing string 104. Thereafter, the extended casing string 104 may be lowered into the wellbore 880.

Figure 9:
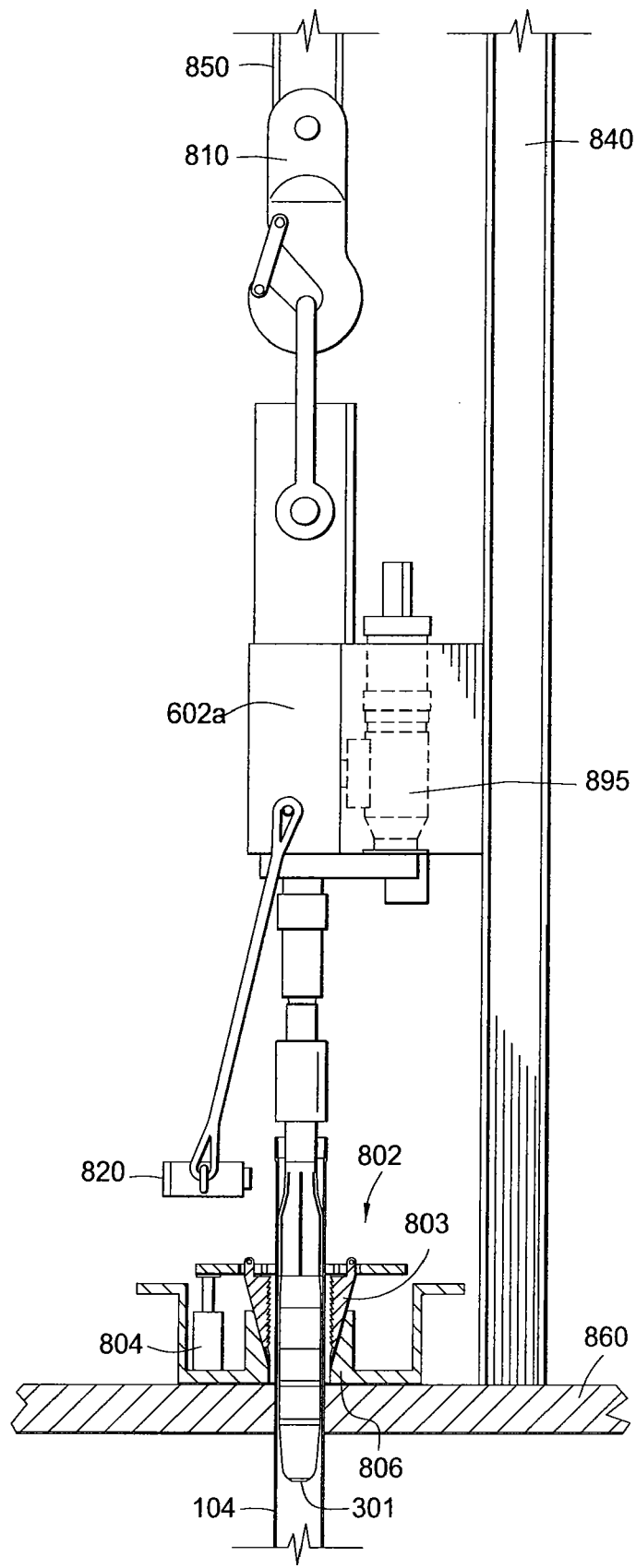
FIG. 9 illustrates the top drive engaged to a tubular that has been lowered through a spider.

FIG. 9 illustrates the top drive 602a engaged to the casing string 104 after the casing string 104 has been lowered through a spider 802. The spider 802 is shown disposed on the platform 860. The spider 802 comprises a slip assembly 806 including a set of slips 803 and piston 804. The slips 803 are wedge-shaped and constructed and arranged to slidably move along a sloped inner wall of the slip assembly 806. The slips 803 are raised or lowered by the piston 804. When the slips 803 are in the lowered position, they close around the outer surface of the casing string 104. The weight of the casing string 104 and the resulting friction between the casing string 104 and the slips 803 force the slips downward and inward, thereby tightening the grip on the casing string 104. When the slips 803 are in the raised position as shown, the slips 803 are opened and the casing string 104 is free to move axially in relation to the slips 803.

Figure 10:
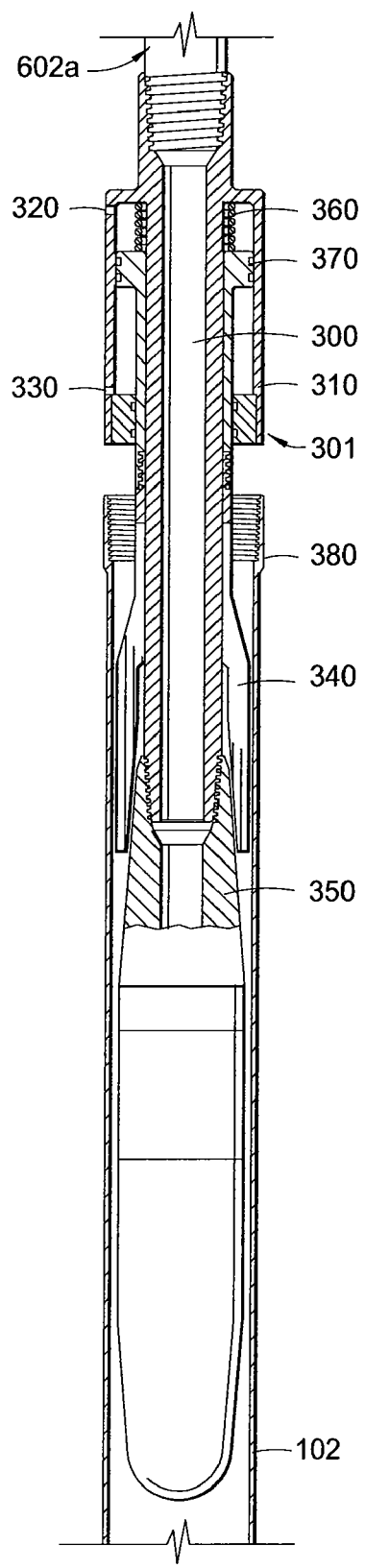
FIG. 10 is a cross-sectional view of a gripping member for use with a top drive for handling tubulars in the un-engaged position.

FIG. 10 is a cross-sectional view of a top drive 602a and a casing 102. The top drive 602a includes a gripping member 301 having a cylindrical body 300, a wedge lock assembly 350, and slips 340 with teeth (not shown). The wedge lock assembly 350 and the slips 340 are disposed around the outer surface of the cylindrical body 300. The slips 340 are constructed and arranged to mechanically grip the inside of the casing 102. The slips 340 are threaded to piston 370 located in a hydraulic cylinder 310. The piston 370 is actuated by pressurized hydraulic fluid injected through fluid ports 320, 330. Additionally, springs 360 are located in the hydraulic cylinder 310 and are shown in a compressed state. When the piston 370 is actuated, the springs 360 decompress and assist the piston 370 in moving the slips 340 relative to the cylindrical body 300. The wedge lock assembly 350 is connected to the cylindrical body 300 and constructed and arranged to force the slips 340 against the inner wall of the casing 102.

In operation, the slips 340, and the wedge lock assembly 350 of top drive 602a are lowered inside the casing 102. Once the slips 340 are in the desired position within the casing 102, pressurized fluid is injected into the piston 370 through fluid port 320. The fluid actuates the piston 370, which forces the slips 340 towards the wedge lock assembly 350. The wedge lock assembly 350 functions to bias the slips 340 outwardly as the slips 340 are slidably forced along the outer surface of the assembly 350, thereby forcing the slips 340 to engage the inner wall of the casing 102.

Figure 11:
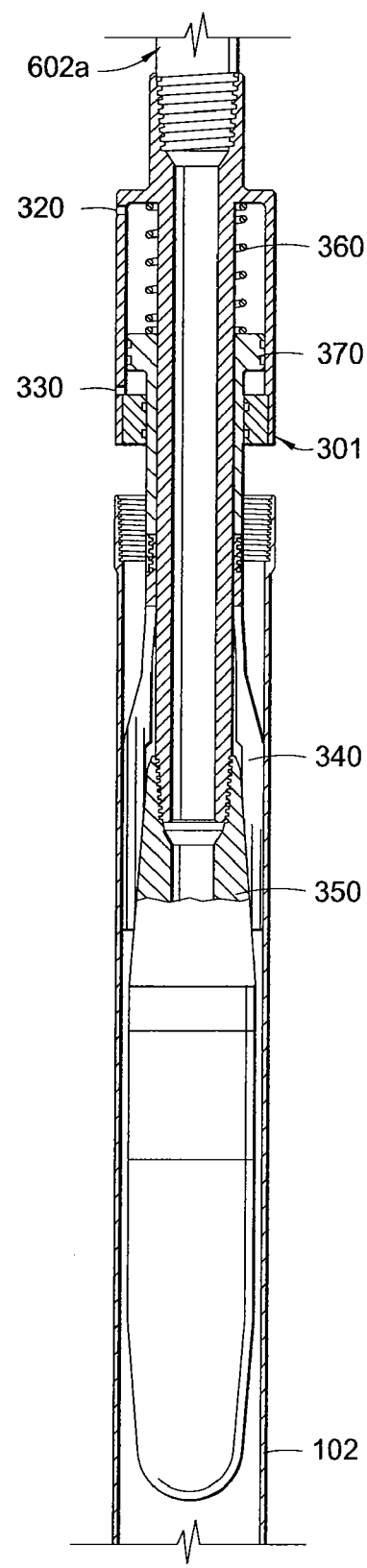
FIG. 11 is a cross-sectional view of the gripping member of FIG. 10 in the engaged position.

FIG. 11 illustrates a cross-sectional view of a top drive 602a engaged to the casing 102. Particularly, the figure shows the slips 340 engaged with the inner wall of the casing 15 and a spring 360 in the decompressed state. In the event of a hydraulic fluid failure, the springs 360 can bias the piston 370 to keep the slips 340 in the engaged position, thereby providing an additional safety feature to prevent inadvertent release of the casing string 104. Once the slips 340 are engaged with the casing 102, the top drive 602a can be raised along with the cylindrical body 300. By raising the body 300, the wedge lock assembly 350 will further bias the slips 340 outward. With the casing 102 retained by the top drive 602a, the top drive 602a may relocate the casing 102 to align and thread the casing 102 with casing string 104.

Detail of Top Drive That Grips Outside Casing

U.S. provisional Patent Application Ser. No. 60/452,318, filed Mar. 5, 2003, is herein incorporated by reference in its entirety.

Figure 12:
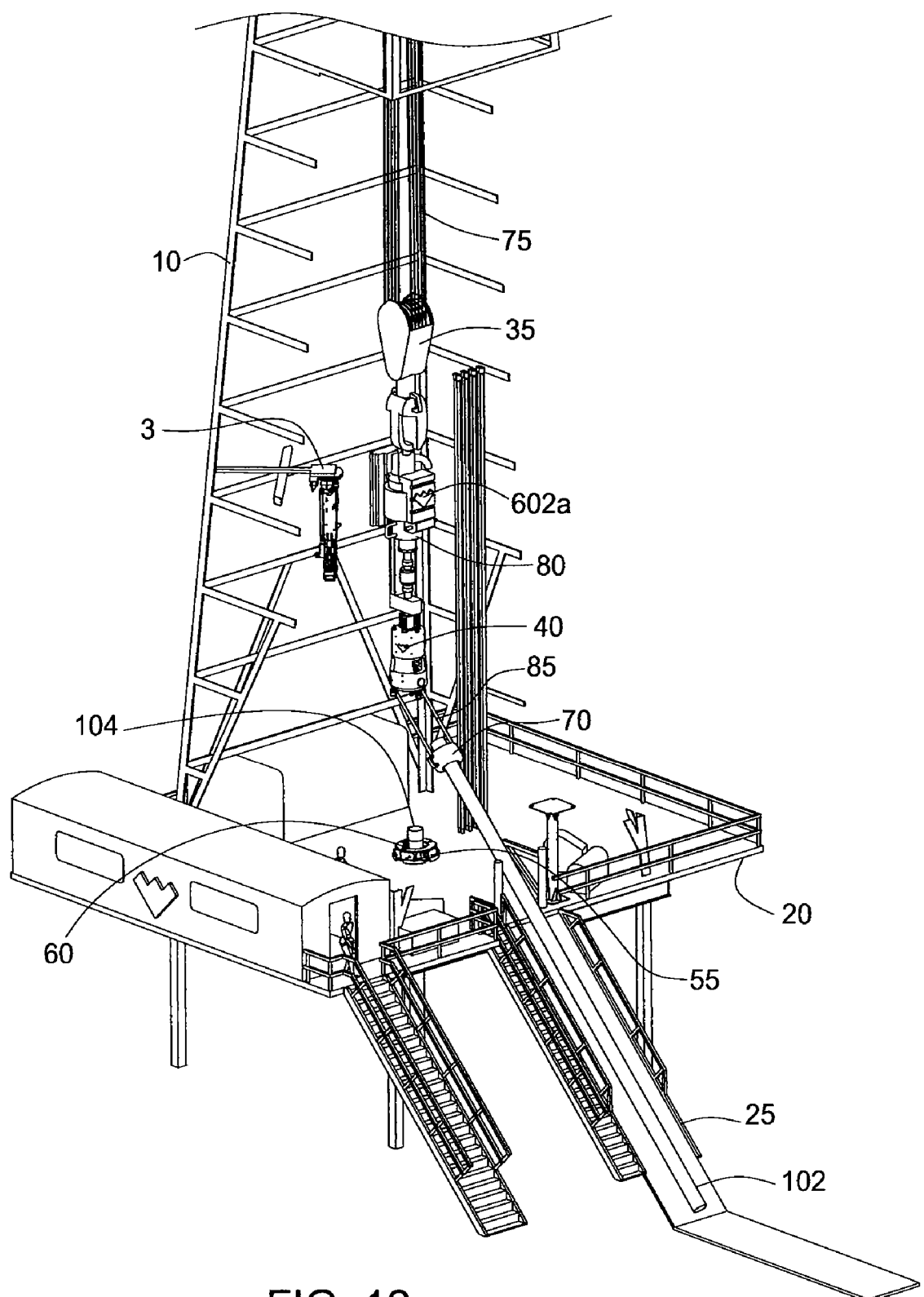
FIG. 12 is a partial view of a rig having a top drive system.

FIG. 12 shows a drilling rig 10 applicable to drilling with casing operations or a wellbore operation that involves picking up/laying down tubulars. The drilling rig 10 is located above a formation at a surface of a well. The drilling rig 10 includes a rig floor 20 and a v-door (not shown). The rig floor 20 has a hole 55 therethrough, the center of which is termed the well center. A spider 60 is disposed around or within the hole 55 to grippingly engage the casings 102, 104 at various stages of the drilling operation. As used herein, each casing 102, 104 may include a single casing or a casing string having more than one casing. Furthermore, other types of wellbore tubulars, such as drill pipe may be used instead of casing.

The drilling rig 10 includes a traveling block 35 suspended by cables 75 above the rig floor 20. The traveling block 35 holds the top drive 602a above the rig floor 20 and may be caused to move the top drive 602a axially. The top drive 602a includes a motor 80 which is used to rotate the casing 102, 104 at various stages of the operation, such as during drilling with casing or while making up or breaking out a connection between the casings 102, 104. A railing system (not shown) is coupled to the top drive 602a to guide the axial movement of the top drive 602a and to prevent the top drive 602a from rotational movement during rotation of the casings 102, 104.

Figure 13:
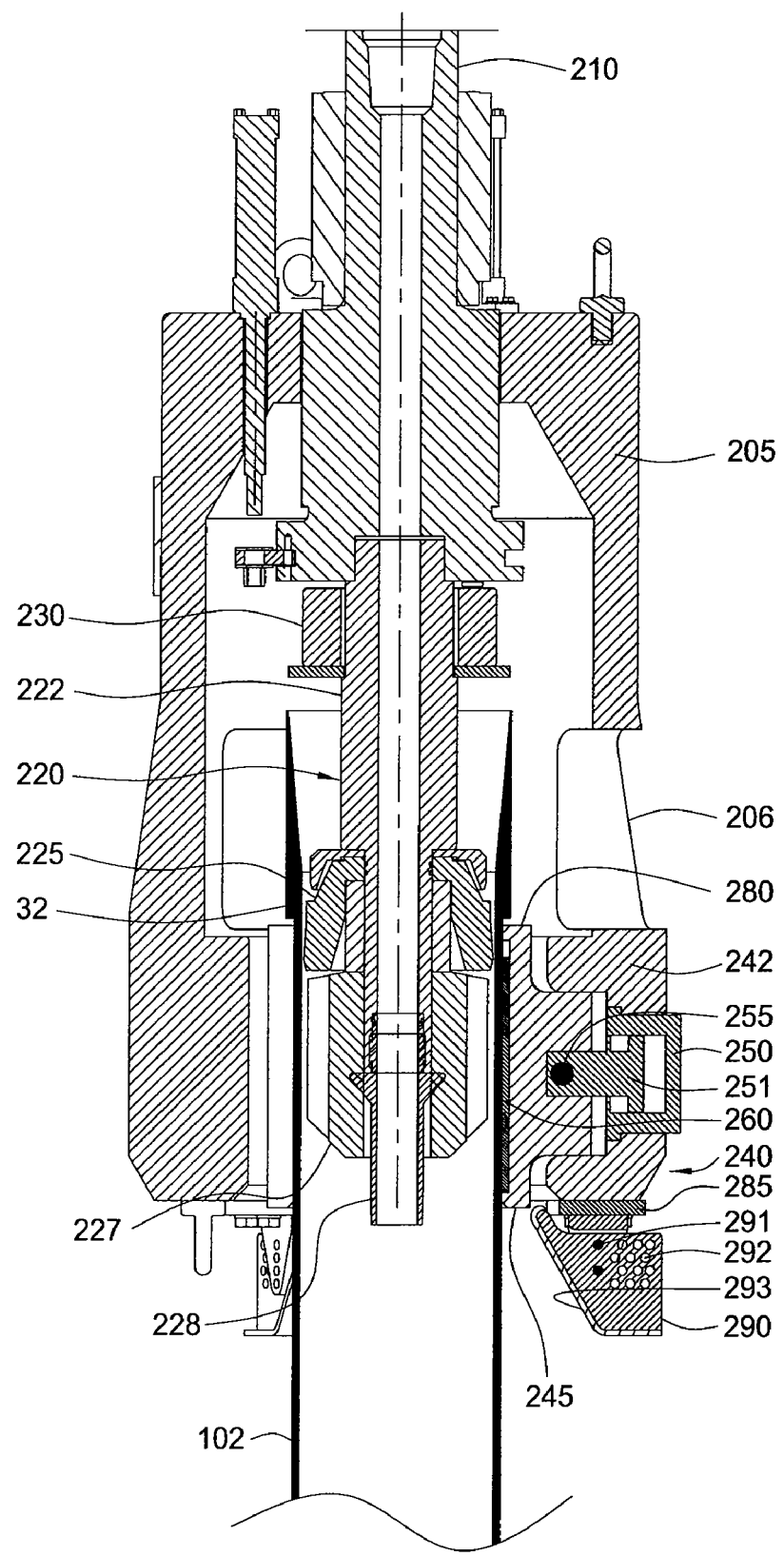
FIG. 13 is a cross-sectional view of a torque head.

Disposed below the top drive 602a is a torque head 40, also known as a top drive adapter. The torque head 40 may be utilized to grip an upper portion of the casing 102 and impart torque from the top drive to the casing 102. FIG. 13 illustrates cross-sectional view of a torque head 40. The torque head 40 is shown engaged with the casing 102. The torque head 40 includes a housing 205 having a central axis. A top drive connector 210 is disposed at an upper portion of the housing 205 for connection with the top drive 602a. Preferably, the top drive connector 210 defines a bore therethrough for fluid communication. The housing 205 may include one or more windows 206 for accessing the housing's interior.

The torque head 40 may optionally employ a circulating tool 220 to supply fluid to fill up the casing 102 and circulate the fluid. The circulating tool 220 may be connected to a lower portion of the top drive connector 210 and disposed in the housing 205. The circulating tool 220 includes a mandrel 222 having a first end and a second end. The first end is coupled to the top drive connector 210 and fluidly communicates with the top drive 602a through the top drive connector 210. The second end is inserted into the casing 102. A cup seal 225 and a centralizer 227 are disposed on the second end interior to the casing 102. The cup seal 225 sealingly engages the inner surface of the casing 102 during operation. Particularly, fluid in the casing 102 expands the cup seal 225 into contact with the casing 102. The centralizer 227 co-axially maintains the casing 102 with the central axis of the housing 205. The circulating tool 220 may also include a nozzle 228 to inject fluid into the casing 102. The nozzle 228 may also act as a mud saver adapter 228 for connecting a mud saver valve (not shown) to the circulating tool 220.

A casing stop member 230 may be disposed on the mandrel 222 below the top drive connector 210. The stop member 230 prevents the casing 102 from contacting the top drive connector 210, thereby protecting the casing 102 from damage. To this end, the stop member 230 may be made of an elastomeric material to substantially absorb the impact from the casing 102.

One or more retaining members 240 may be employed to engage the casing 102. As shown, the torque head 40 includes three retaining members 240 mounted in spaced apart relation about the housing 205. Each retaining member 240 includes a jaw 245 disposed in a jaw carrier 242. The jaw 245 is adapted and designed to move radially relative to the jaw carrier 242. Particularly, a back portion of the jaw 245 is supported by the jaw carrier 242 as it moves radially in and out of the jaw carrier 242. In this respect, an axial load acting on the jaw 245 may be transferred to the housing 205 via the jaw carrier 242. Preferably, the contact portion of the jaw 245 defines an arcuate portion sharing a central axis with the casing 102. It must be noted that the jaw carrier 242 may be formed as part of the housing 205 or attached to the housing 205 as part of the gripping member assembly.

Movement of the jaw 245 is accomplished by a piston 251 and cylinder 250 assembly. In one embodiment, the cylinder 250 is attached to the jaw carrier 242, and the piston 251 is movably attached to the jaw 245. Pressure supplied to the backside of the piston 251 causes the piston 251 to move the jaw 245 radially toward the central axis to engage the casing 102. Conversely, fluid supplied to the front side of the piston 251 moves the jaw 245 away from the central axis. When the appropriate pressure is applied, the jaws 245 engage the casing 102, thereby allowing the top drive 602a to move the casing 102 axially or rotationally.

In one aspect, the piston 251 is pivotably connected to the jaw 245. As shown in FIG. 13, a pin connection 255 is used to connect the piston 251 to the jaw 245. It is believed that a pivotable connection limits the transfer of an axial load on the jaw 245 to the piston 251. Instead, the axial load is mostly transmitted to the jaw carrier 242 or the housing 205. In this respect, the pivotable connection reduces the likelihood that the piston 251 may be bent or damaged by the axial load. It is understood that the piston 251 and cylinder 250 assembly may include any suitable fluid operated piston 251 and cylinder 250 assembly known to a person of ordinary skill in the art. Exemplary piston and cylinder assemblies include a hydraulically operated piston and cylinder assembly and a pneumatically operated piston and cylinder assembly.

Figure 13A:
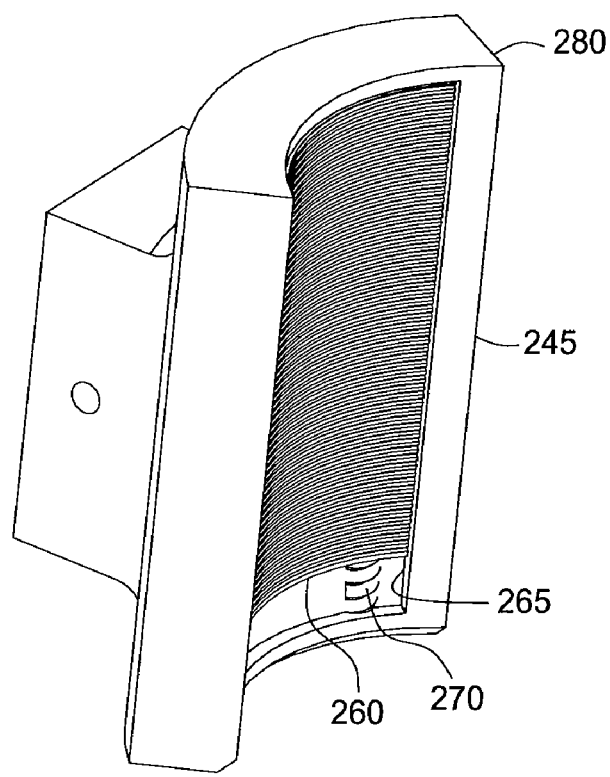
FIGS. 13A-B are isometric views of a jaw for a torque head.

The jaws 245 may include one or more inserts 260 movably disposed thereon for engaging the casing 102. The inserts 260, or dies, include teeth formed on its surface to grippingly engage the casing 102 and transmit torque thereto. In one embodiment, the inserts 260 may be disposed in a recess 265 as shown in FIG. 13A. One or more biasing members 270 may be disposed below the inserts 260. The biasing members 270 allow some relative movement between the casing 102 and the jaw 245. When the casing 102 is released, the biasing member 270 moves the inserts 260 back to the original position. Optionally, the contact surface between the inserts 260 and the jaw recess 265 may be tapered. The tapered surface may be angled relative to the central axis of the casing 102, thereby extending the insert 260 radially as it moves downward along the tapered surface.

Figure 13B:
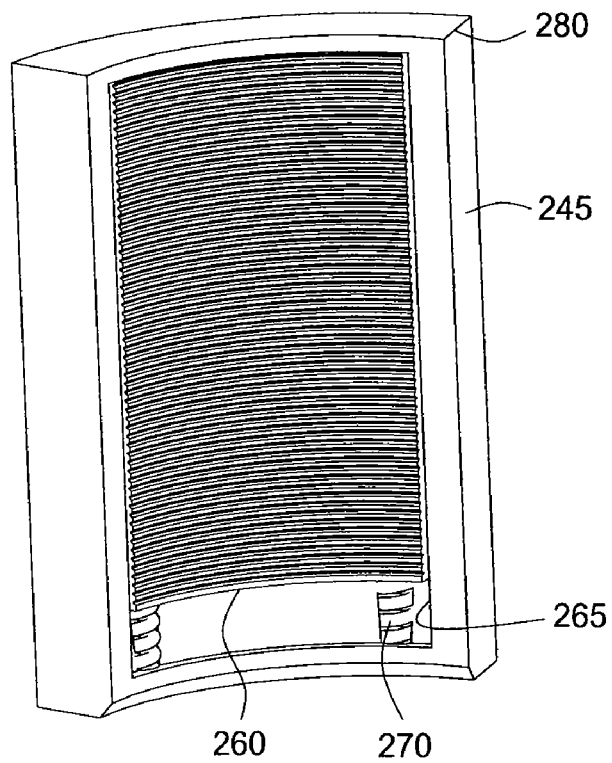

Additionally, the outer perimeter of the jaw 245 around the jaw recess 265 may aide the jaws 245 in supporting the load of the casing 102. In this respect, the upper portion of the perimeter provides a shoulder 280 for engagement with the coupling 32 on the casing 102 as illustrated FIGS. 13A and 13B. The axial load acting on the shoulder 280 may be transmitted from the jaw 245 to the housing 205.

A base plate 285 may be attached to a lower portion of the torque head 40. A guide plate 290 may be selectively attached to the base plate 285 using a removable pin connection. The guide plate 290 has an incline edge 293 adapted and designed to guide the casing 102 into the housing 205. The guide plate 290 may be quickly adjusted to accommodate tubulars of various sizes. In one embodiment, one or more pin holes 292 may be formed on the guide plate 290, with each pin hole 292 representing a certain tubular size. To adjust the guide plate 290, the pin 291 is removed and inserted into the designated pin hole 292. In this manner, the guide plate 290 may be quickly adapted for use with different tubulars.

Referring to FIG. 12, an elevator 70 operatively connected to the torque head 40 may be used to transport the casing 102 from a rack 25 or a pickup/lay down machine to the well center. The elevator 70 may include any suitable elevator known to a person of ordinary skill in the art. The elevator defines a central opening to accommodate the casing 102. Bails 85 may be used to interconnect the elevator 70 to the torque head 40. Preferably, the bails 85 are pivotable relative to the torque head 40. As shown in FIG. 12, the top drive 602a has been lowered to a position proximate the rig floor 20, and the elevator 70 has been closed around the casing 102 resting on the rack 25. In this position, the casing 102 is ready to be hoisted by the top drive 602a.

The casing string 104, which was previously drilled into the formation (not shown) to form the wellbore (not shown), is shown disposed within the hole 55 in the rig floor 20. The casing string 104 may include one or more joints or sections of casing threadedly connected to one another. The casing string 104 is shown engaged by the spider 60. The spider 60 supports the casing string 104 in the wellbore and prevents the axial and rotational movement of the casing string 104 relative to the rig floor 20. As shown, a threaded connection of the casing string 104, or the box, is accessible from the rig floor 20.

The top drive 602a, the torque head 40, and the elevator 70 are shown positioned proximate the rig floor 20. The casing 102 may initially be disposed on the rack 25, which may include a pick up/lay down machine. The elevator 70 is shown engaging an upper portion of the casing 102 and ready to be hoisted by the cables 75 suspending the traveling block 35. The lower portion of the casing 102 includes a threaded connection, or the pin, which may mate with the box of the casing string 104.

Next, the torque head 40 is lowered relative to the casing 102 and positioned around the upper portion of the casing 102. The guide plate 290 facilitates the positioning of the casing 102 within the housing 205. Thereafter, the jaws 245 of the torque head 40 are actuated to engage the casing 102. Particularly, fluid is supplied to the piston 251 and cylinder 250 assembly to extend the jaws 245 radially into contact with the casing 102. The biasing member 270 allows the inserts 260 and the casing 102 to move axially relative to the jaws 245. As a result, the coupling 32 seats above the shoulder 280 of the jaw 245. The axial load on the jaw 245 is then transmitted to the housing 205 through the jaw carrier 242. Because of the pivotable connection with the jaw 245, the piston 251 is protected from damage that may be cause by the axial load. After the torque head 40 engages the casing 102, the casing 102 is longitudinally and rotationally fixed with respect to the torque head 40. Optionally, a fill-up/circulating tool disposed in the torque head 40 may be inserted into the casing 102 to circulate fluid.

In this position, the top drive 602a may now be employed to complete the make up of the threaded connection. To this end, the top drive 602a may apply the necessary torque to rotate the casing 102 to complete the make up process. Initially, the torque is imparted to the torque head 40. The torque is then transferred from the torque head 40 to the jaws 245, thereby rotating the casing 102 relative to the casing string 104.

After the casing 102 and the casing string 104 are connected, the drilling with casing operation may begin. Initially, the spider 60 is released from engagement with the casing string 104, thereby allowing the new casing string 102, 104 to move axially or rotationally in the wellbore. After the release, the casing string 102, 104 is supported by the top drive 602a. The drill bit disposed at the lower end of the casing string 102, 104 is urged into the formation and rotated by the top drive 602a.

When additional casings are necessary, the top drive 602a is deactuated to temporarily stop drilling. Then, the spider 60 is actuated again to engage and support the casing string 102, 104 in the wellbore. Thereafter, the torque head 40 releases the casing 102 and is raised by the traveling block 35. Additional strings of casing may now be added to the casing string using the same process as described above.

While the foregoing is directed to embodiments of the present invention, other and further embodiments of the invention may be devised without departing from the basic scope thereof, and the scope thereof is determined by the claims that follow.

What is claimed is:

1. A method of connecting threaded tubulars for use in a wellbore, comprising:
    rotating a first threaded tubular relative to a second threaded tubular, wherein each of the threaded tubulars comprises a shoulder;
    during rotation of the first threaded tubular:
        calculating a rate of change in torque with respect to rotation; and
        detecting a shoulder condition by monitoring the rate of change in torque with respect to rotation;
    determining acceptability of the threaded connection; and
    stopping rotation of the first threaded member when reaching a predefined rotation value from the shoulder condition.

2. The method of claim 1, further comprising measuring torque and rotation at regular intervals.

3. The method of claim 1, wherein the shoulder condition occurs when the shoulders engage.

4. The method of claim 2, wherein acceptability is determined using a torque and/or rotation value measured at the shoulder condition.

5. The method of claim 2, further comprising calculating a target rotation value during rotation of the first tubular based on the shoulder condition irrespective of a maximum torque limit.

6. The method of claim 2, further comprising detecting a seal condition during rotation of the first threaded tubular member by monitoring the rate of change in torque with respect to rotation.

7. The method of claim 6, wherein acceptability is determined using a torque and/or rotation value measured at the seal condition.

8. The method of claim 7, wherein acceptability is determined using a change in value between a torque and/or rotation value measured at the shoulder condition and the torque and/or rotation value measured at the seal condition.

9. The method of claim 2,
    further comprising measuring relaxation rotation of the first threaded tubular member,
    wherein acceptability is determined by comparing the measured relaxation rotation to a predetermined relaxation rotation.

10. The method of claim 1, wherein acceptability is determined after the shoulder condition is detected by comparing the rate of change in torque with respect to rotation to a predetermined rate.

11. The method of claim 1, wherein:
    each tubular further comprises a metal sealing surface, and
    during rotation of the first tubular:
        the sealing surfaces contact each other, and
        one of the sealing surfaces deforms against the other sealing surface to form a fluid-tight seal.

12. The method of claim 1, wherein:
    the tubulars are drill pipe, and
    the method further comprises drilling the wellbore after stopping rotation of the first tubular by rotating the tubulars, lowering the tubulars, and injecting drilling fluid into the tubulars.

13. The method of claim 1, wherein:
    the tubulars are casing, and
    the method further comprises drilling the wellbore after stopping rotation of the first tubular by rotating the tubulars, lowering the tubulars, and injecting drilling fluid into the tubulars.

14. A system for connecting threaded tubulars for use in a wellbore, comprising:
    a power drive unit operable to rotate a first threaded tubular relative to a second threaded tubular;
    a power drive control system operably connected to the power drive unit, and comprising:
        a torque detector;
        a turns detector; and
        a computer receiving torque measurements taken by the torque detector and rotation measurements taken by the turns detector; wherein the computer is configured to perform an operation, comprising:
            rotating a first threaded tubular relative to a second threaded tubular, wherein each of the threaded tubulars comprises a shoulder;
            during rotation of the first threaded tubular:
                calculating a rate of change in torque with respect to rotation; and
                detecting a shoulder condition by monitoring the rate of change in torque with respect to rotation;
            determining acceptability of the threaded connection; and
            stopping rotation of the first threaded member when reaching a predefined rotation value from the shoulder condition.

15. The system of claim 14, wherein the power drive unit is a power tongs unit and the power drive control system is a power tongs control system.

16. The system of claim 14, wherein the power drive unit is a top drive unit and the power drive control system is a top drive control system.

17. The system of claim 14, wherein:
the operation further comprises measuring relaxation rotation of the first threaded member, and
acceptability is determined by comparing the measured relaxation rotation to a predetermined relaxation rotation.

18. The system of claim 14, wherein acceptability is determined using a torque and/or rotation value measured at the shoulder condition.

19. The system of claim 14, wherein the operation further comprises detecting a seal condition during rotation of the first threaded tubular by monitoring the rate of change in torque with respect to rotation.

20. The system of claim 19, wherein acceptability is determined using a torque and/or rotation value measured at the seal condition.

21. The system of claim 20, wherein acceptability is determined using a change in value between a torque and/or rotation value measured at the shoulder condition and the torque and/or rotation value measured at the seal condition.

22. The system of claim 14, wherein acceptability is determined after the shoulder condition is detected by comparing the rate of change in torque with respect to rotation to a predetermined rate.

23. The system of claim 14, wherein:
each tubular further comprises a metal sealing surface, and
during rotation of the first tubular:
the sealing surfaces contact each other, and
one of the sealing surfaces deforms against the other sealing surface to form a fluid-tight seal.

24. A method of connecting threaded tubulars for use in a wellbore, comprising:
rotating a first threaded tubular relative to a second threaded tubular, wherein each of the threaded tubulars comprises a shoulder;
during rotation of the first threaded tubular:
calculating a torque differential at regular rotation intervals, wherein the torque differential is an incremental change in torque divided by an incremental change in rotation; and
detecting a shoulder condition by monitoring the torque differential;
determining acceptability of the threaded connection; and
stopping rotation of the first threaded member when reaching a predefined rotation value from the shoulder condition.

25. A method of connecting threaded tubulars for use in a wellbore, comprising:
rotating a first threaded tubular relative to a second threaded tubular, wherein each of the threaded tubulars comprises a shoulder;
during rotation of the first threaded tubular:
calculating a rate of change in torque with respect to rotation;
detecting a shoulder condition by monitoring the rate of change in torque with respect to rotation; and
determining acceptability of the threaded connection; and
stopping rotation of the first threaded member when reaching a predefined rotation value from the shoulder condition if the threaded connection is acceptable.

* * * * *